Patented Nov. 21, 1950

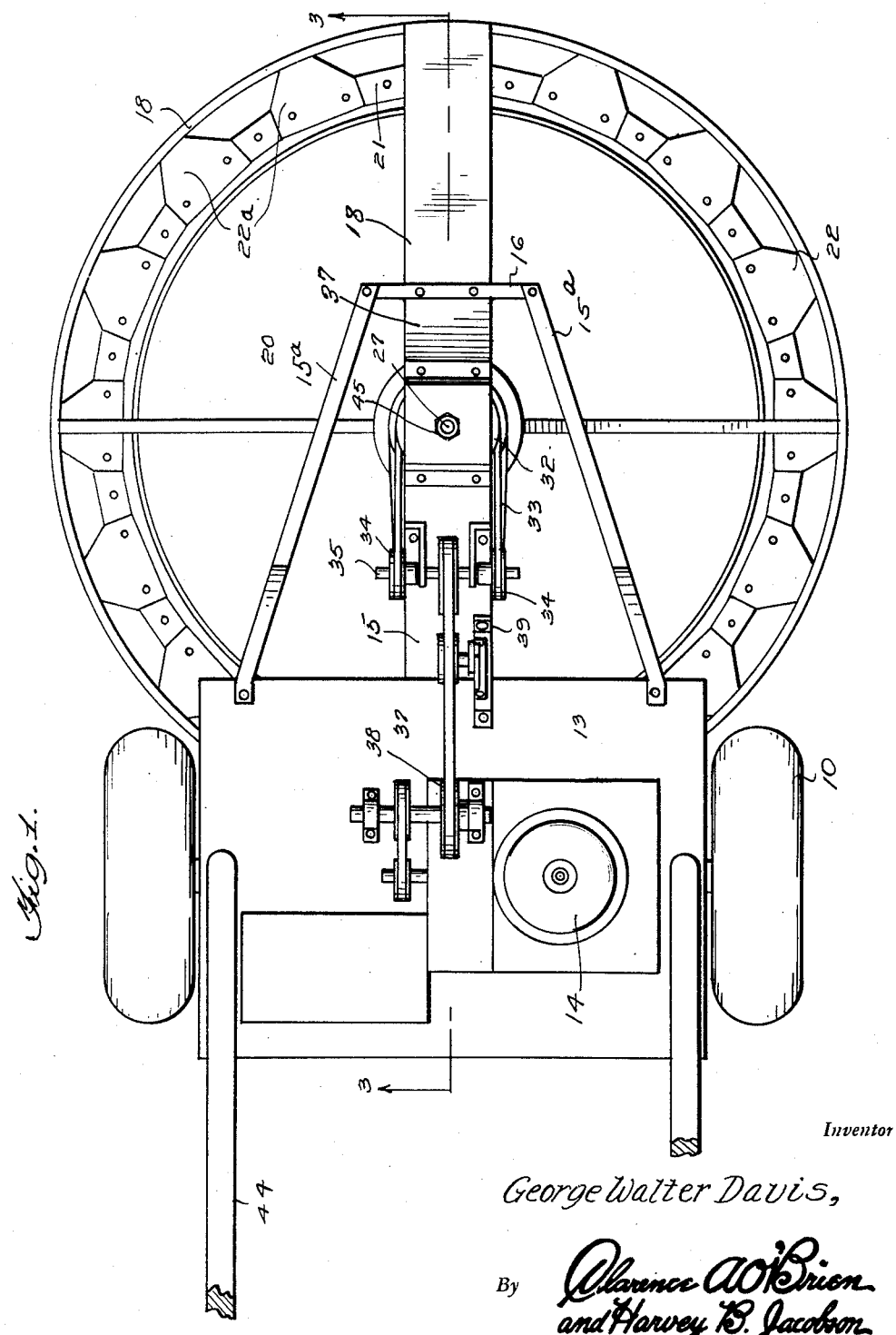

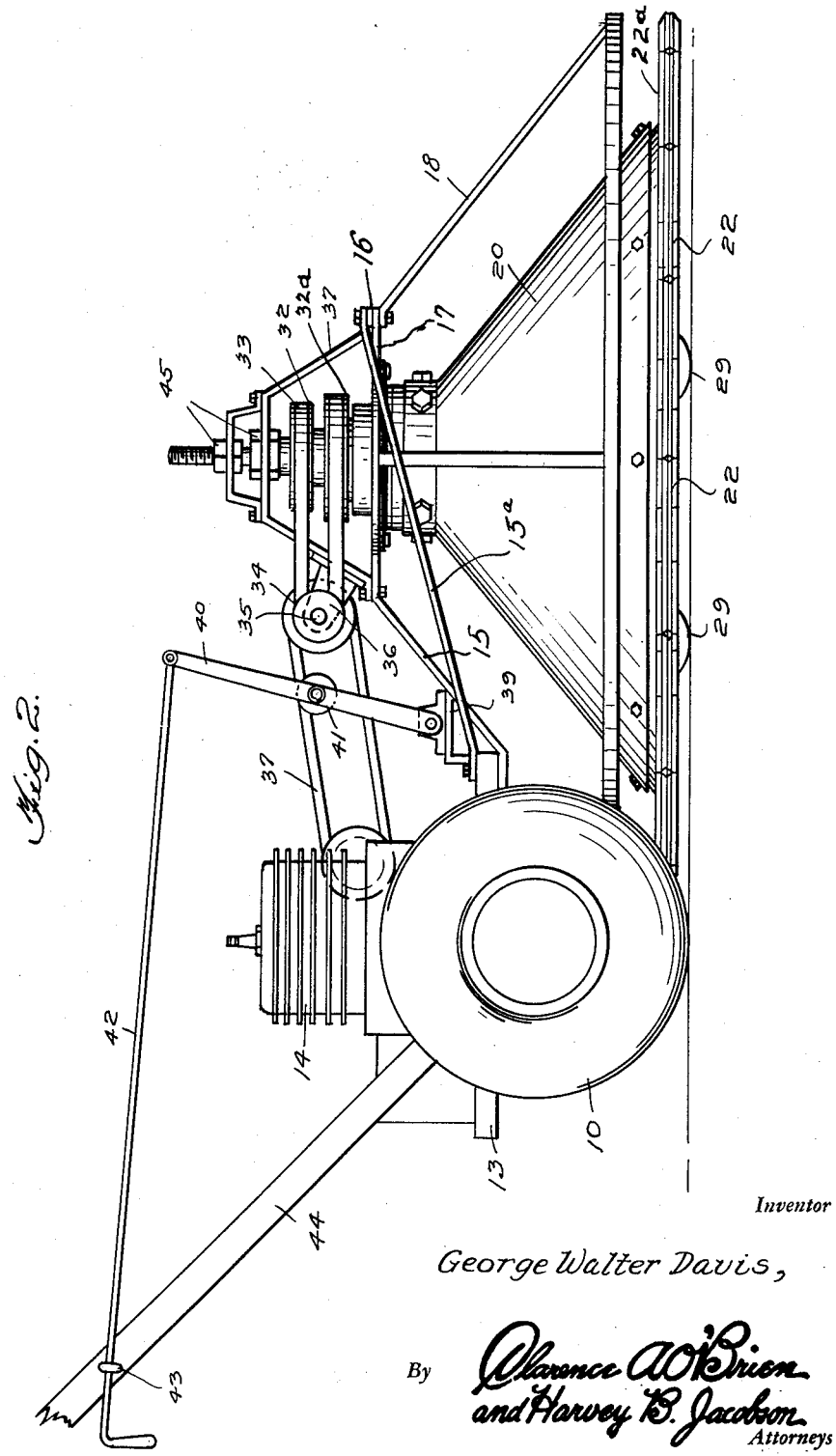

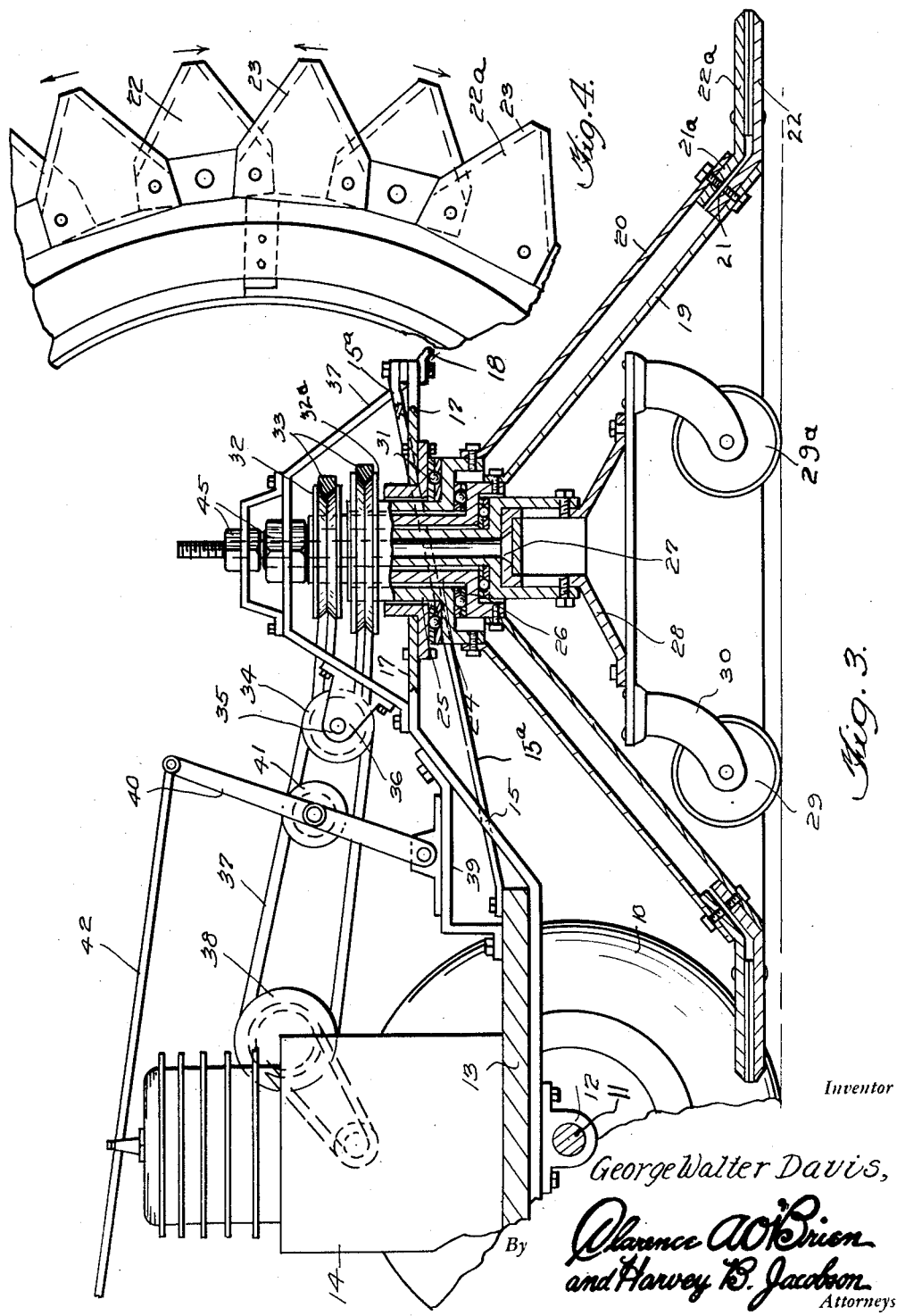

2,530,684

UNITED STATES PATENT OFFICE 2,530,684

ROTARY SICKLE MOWER

George Walter Davis, Gibson City, Ill.

Application August 13, 1945, Serial No. 610,632

4 Claims. (Cl. 56—25.4)

The invention relates to a rotary sickle mower, and more especially to a motor powered rotary lawn mower.

The primary object of the invention is the provision of a mower of this character, wherein through the use of reverse rotary traveling cutter blades in superposed relation to each other a sheer cutting action can be had for the cutting of grass, weeds or the like from a lawn or other area, the cutting blades being driven from motive power unit tractioned by a carriage supporting the said blades manually pushed or pulled and such mower is practically devoid of vibration.

Another object of the invention is the provision of a mower of this character, wherein the cutting blades have their rotors, one nested within the other in superposed relation to each other, the mounting of the rotors being novel and unique in the arrangement thereof and will operate with minimum power consumption.

A further object of the invention is the provision of a mower of this character, wherein it can be maneuvered with ease and dispatch, it being readily controlled and guided in a selected course, there being no gear parts for the transmission of power thereto.

A still further object of the invention is the provision of a mower of this character, which is simple in construction, thoroughly reliable and efficient in operation, strong, durable, economically operated, as well as economical in repair costs, readily and easily controlled, compact, conveniently handled, it being one man serviced, and inexpensive to manufacture.

With these and other objects in view, the invention consists in the features of construction, combination and arrangement of parts, as will be hereinafter more fully described, illustrated in the accompanying drawings, which disclose the preferred embodiment of the invention and pointed out in the claims hereunto appended.

In the accompanying drawings:

Figure 1 is a top plan view of the mower constructed in accordance with the invention.

Figure 2 is a side view thereof.

Figure 3 is a sectional view with parts removed taken approximately on the line 3—3 of Figure 1, looking in the direction of the arrows.

Figure 4 is an enlarged fragmentary plan view of the cutter blades.

Similar reference characters indicate corresponding parts throughout the several views in the drawings.

Referring to the drawings in detail, the mower constituting the present invention, comprises a wheeled carriage involving traction wheels 10, preferably rubber tired, and two in number, their axle 11 being journaled in axle bearings 12 fixed to and depending from a truck platform 13 of the required size, which is preferably of elongated or rectangular shape. Stationarily supported upon this platform 13 is a vertical type internal combustion motor unit 14, which is the power medium for the mower.

Extended forwardly from the platform 13 and united therewith in any suitable manner is an upwardly stepped and outwardly tapered supporting frame 15 which at its outer end 16 is joined to a longitudinally disposed and centrally located hanger bridge 17 which carries a circular canopy-like cutter guard 18. Also extending forwardly from the platform 13 is a pair of converging braces 15a secured to the outer end 16 of the frame 15.

The guard 18 overhangs a pair of nested substantially conical shaped rotors 19 and 20, respectively, which at the outer peripheries thereof have detachably fixed thereto blade rings 21 and 21a carrying sickle toothed cutter blades 22 and 22a, which in their series are superposed with respect to each other and one series rotates in a circular path horizontally in one direction while the other series rotates in a horizontal direction in a reverse direction, so that these cutter blades 22 and 22a will effect a sheer cutting action at the cutting edges 23 thereof when the blades of one series pass the blades of the other series in the operation of the power unit.

The rotors 19 and 20 are centered with respect to each other through the telescopically interfitted tubular journal stems 24 and 25, respectively, rising vertically from a center head 26 to the rotors. The stem 24 is journaled on a steering column 27 of a swivelled caster assembly 28 with wheels 29 and 29a in turnable bearings 30 depending from such caster 28. Fitted between the heads 26 are caged anti-friction bearings 31. Vertical adjustment of the column 27 will raise the lowermost cutter blades 22 the proper distance from a lawn or other like area during the cutting operation of the mower. The rotors 19 and 20 are detachably coupled to the bridge 17 in any suitable manner, and fixed to the stem 24 and 25 of such rotors are driven belt pulleys 32 and 32a having trained thereover the endless driven belt 33 which is also trained over a pair of belt pulleys 34 upon a driven shaft 35 journaled in bearings 36 fixed to a crowned bracket 37 on the bridge 17. The shaft 35 is driven from a driving belt and pulley connection 37 and 38, respectively, by the motor or engine 14 upon the platform 13. On a member 39 upon the carriage is pivotally supported an upstanding swingable throw lever 40 having a rotatable clutch pulley 41 designed to engage the belt 37 for the tightening and slackening thereof and in this way power transmission to the rotors 19 and 20 is controlled. When the belt 37 is slackened the power transmission to the rotors is cut off and on the tightening of such belt 37 the power thereto is turned on. The lever 40 has connected thereto a hand control rod 42 which extends rearwardly of the mower in convenient reach of a user thereof, such rod being slidably connected at 43 to one of a pair of handle bars 44, only portions thereof being shown and extend upwardly in a rearward direction from the carriage so that the mower can be moved by hand, pushing or pulling in the usual well known manner.

The journal column 27 of the caster 28 is swivel fitted by retaining nuts 45, one being also used for the rotatable fastening of the rotors 19 and 20 in place, as will be clearly apparent from Figure 3 of the drawings.

In the operation of the mower when the same is manually moved and the engine is active for the transmission of power to the rotors 19 and 20, these will rotate in reverse directions to each other by the arrangement of the belt 33, so that the cutter blades when passing one another common to the respective rotors will effect a sheer cutting action for the cutting of grass, weeds or the like from a lawn or other areas. The mower is practically devoid of vibration and the rotors 19 and 20 spin in reverse directions to each other and under a minimum consumption of power. The caster wheels or rollers 29 support the cutters 22 at the proper elevation from the ground for the successful cutting of grass, weeds or the like as the mower is moved thereover.

What is claimed is:

1. A mower of the character described, comprising a carriage having ground contacting wheels at the rear of the carriage, rotors supported by the carriage and superposed and nested one within the other, each rotor having hollow frusto-conical walls, the angular inclination of the walls corresponding generally in direction with the downward centrifugal movement of grass cut by the mower so that clogging of the rotors is prevented, sickle blade cutters on the blade rings and following circular paths for cooperation with each other to effect sheer cutting action thereby, said blade rings being detachable power transmission means on the carriage for driving the rotors in reverse directions to each other, manually controlled means for regulating the power transmission, and a wheeled caster swivelled on the carriage for sustaining the cutters properly spaced from the ground.

2. A mower of the character described, comprising a carriage having ground contacting wheels at the rear of the carriage, rotors supported by the carriage and superposed and nested one within the other, each rotor having hollow frusto-conical walls, the angular inclination of the walls corresponding generally in direction with the downward centrifugal movement of grass cut by the mower so that clogging of the rotors is prevented, sickle blade cutters on the blade rings and following circular paths for cooperation with each other to effect sheer cutting action thereby, said blade rings being detachable power transmission means on the carriage for driving the rotors in reverse directions to each other, manually controlled means for regulating the power transmission, a wheeled caster swivelled on the carriage for sustaining the cutters properly spaced from the ground, and a power unit on the carriage for the power transmission, and means for simultaneously reversing the direction of rotation of both rotors.

3. A mower of the character described, comprising a carriage having ground contacting wheels at the rear of the carriage, rotors supported by the carriage and superposed and nested one within the other, each rotor having hollow frusto-conical walls, the angular inclination of the walls corresponding generally in direction with the downward centrifugal movement of grass cut by the mower so that clogging of the rotors is prevented, sickle blade cutters on the blade rings and following circular paths for cooperation with each other to effect sheer cutting action thereby, said blade rings being detachable power transmission means on the carriage for driving the rotors in reverse directions to each other, manually controlled means for regulating the power transmission, a wheeled caster swivelled on the carriage for sustaining the cutters properly spaced from the ground, a power unit on the carriage for the power transmission, a canopy-like guard overhanging the rotors and cutters and supported by the carriage.

4. A mower of the character described, comprising a carriage having ground contacting wheels at the rear of the carriage, rotors supported by the carriage and superposed and nested one within the other, each rotor having hollow frusto-conical walls, the angular inclination of the walls corresponding generally in direction with the downward centrifugal movement of grass cut by the mower so that clogging of the rotors is prevented, sickle blade cutters on the blade rings and following circular paths for cooperation with each other to effect sheer cutting action thereby, said blade rings being detachable power transmission means on the carriage for driving the rotors in reverse directions to each other, manually controlled means for regulating the power transmission, a wheeled caster swivelled on the carriage for sustaining the cutters properly spaced from the ground, a power unit on the carriage for the power transmission, a canopy-like guard overhanging the rotors and cutters and supported by the carriage, said transmission means including a pair of drive pulleys on a driven shaft, a pair of driven pulleys each fixed to one of said rotors, and means for fixing one of said drive pulleys to said driven shaft while the other of said drive pulleys is free to rotate on said shaft, an endless belt entrained over all said pulleys, the selection of the drive pulley to be so fixed determining the direction of rotation of the rotors.

GEORGE WALTER DAVIS.

REFERENCES CITED

The following references are of record in the file of this patent:

UNITED STATES PATENTS

| Number | Name | Date |
|---|---|---|
| 784,396 | Hall | Mar. 7, 1905 |
| 1,130,283 | Hewett et al. | Mar. 2, 1915 |
| 1,275,851 | Comfort | Aug. 13, 1918 |
| 2,121,749 | Urschel | June 21, 1938 |
| 2,194,617 | Scott | Mar. 26, 1940 |
| 2,368,290 | Donald | Jan. 30, 1945 |
| 2,390,321 | Packwood | Dec. 4, 1945 |